Figure 1:
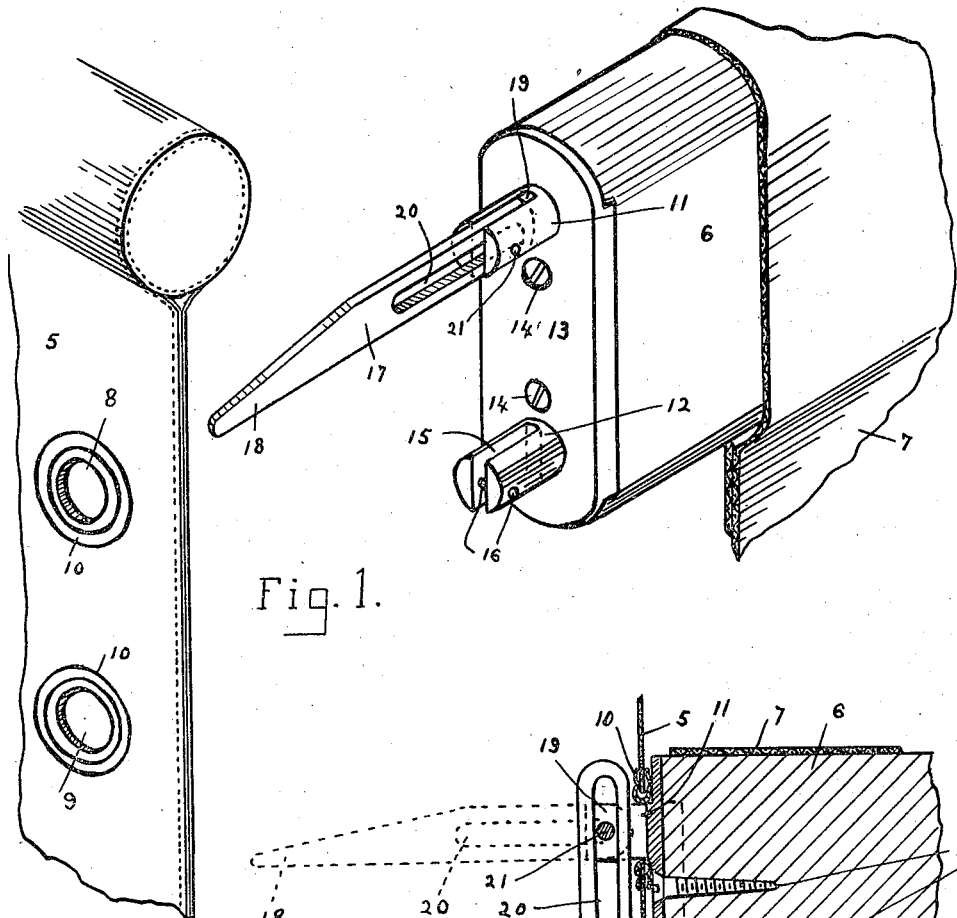

W. B. FOSTER.
DETACHABLE FASTENER.
APPLICATION FILED AUG. 23, 1915.

1,178,848.

Patented Apr. 11, 1916.

WITNESSES:
Anna Holmberg
Harriet Williams

INVENTOR
William B. Foster
BY Martin & Jones
ATTORNEYS

UNITED STATES PATENT OFFICE.

WILLIAM B. FOSTER, OF UTICA, NEW YORK, ASSIGNOR TO FOSTER BROTHERS MANUFACTURING COMPANY, OF UTICA, NEW YORK, A CORPORATION.

DETACHABLE FASTENER.

1,178,848.  Specification of Letters Patent. Patented Apr. 11, 1916.

Application filed August 23, 1915. Serial No. 46,988.

*To all whom it may concern:*

Be it known that I, WILLIAM B. FOSTER, of Utica, in the county of Oneida and State of New York, have invented certain new and useful Improvements in Detachable Fasteners; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a fastener for detachably connecting two members.

I have illustrated my invention as used to detachably connect the back rail of a couch hammock to the flexible end piece or wind shield of the couch hammock, as that is a particularly desirable application of my invention, but it will be understood that it is not limited to such use and is applicable in many places where a detachable fastener is required.

The purpose of my invention is to provide an improved fastener of the character described and one which is economical in construction and attachment to the members to be connected.

A further purpose is to provide a fastener the parts of which are readily connected or disconnected and which when once assembled remains connected without danger of accidental displacement.

A further purpose is to provide a fastener of the character described where the movable locking latch or link when once in place upon the assembled fastener tends to remain in place through its own weight and in which moreover provision is made to lock or wedge the locking link in place to more securely hold the two members together that are connected by the fastener and to prevent any possibility of accidental displacement or disconnection of the fastener.

A still further purpose of my invention is to provide a fastener where all the pieces of each part of the fastener are permanently connected so that there is no danger of loss of a part necessary to complete the fastening operation.

Further purposes and advantages of my invention will appear from the specification and claims herein.

Figure 2:
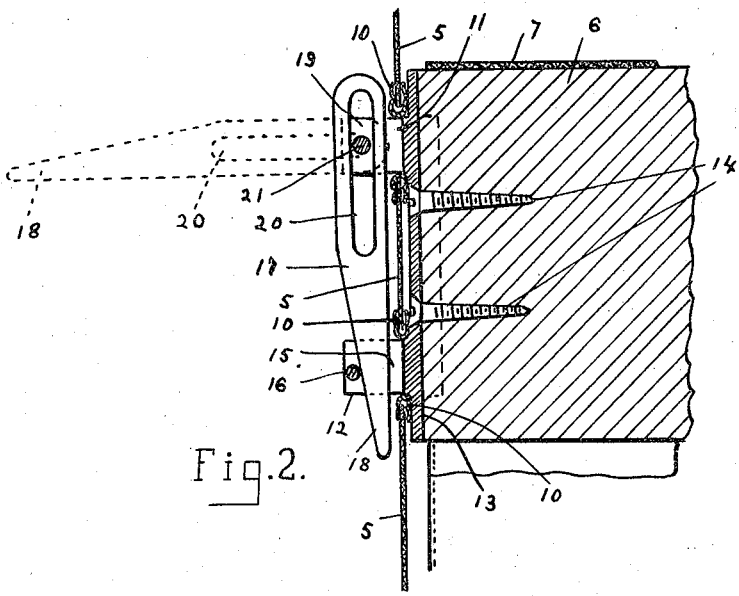

Figure 1 is a perspective view of a fastener embodying my invention as utilized to detachably connect the back rail and end wind shield of a couch hammock, the parts being in position to be connected. Fig. 2 is a vertical sectional view longitudinally of the back rail when the fastener is in assembled or connected position.

Referring to the drawings in a more particular description, there are shown two members to be connected by the fastener, the first of said members being the flexible or fabric end piece or wind shield 5 of a couch hammock and the other element being the top back rail 6 which usually supports the back wind shield 7. In the first member 5 or end piece in desired position and spaced from each other are provided two eyes 8 and 9 preferably reinforced by metallic rings 10 surrounding the eyes on both sides of the fabric and securely fastened to each other in the manner commonly used where eyes are provided through soft or flexible material. Upon the end of the second member 6 which is to be detachably connected to the first member 5 are provided two fingers 11 and 12, or upper and lower fingers respectively, as illustrated in the drawings. These fingers may be integral with the second element 6 but more conveniently will be formed as illustrated upon a separate piece or end plate 13 securely fastened to the second member 6 as by means of screws 14. The fingers 11 and 12 are spaced apart the same distance as are the eyes 8 and 9 and are of such size and length as to be readily inserted into the said eyes and to project therethrough.

In the lower finger 12 there is provided an opening 15 extending longitudinally of the finger and transversely thereof so as to be in line with the other finger 11. Said opening may conveniently be formed by forming the finger 12 with a slot extending longitudinally of the finger from its free end nearly toward the plate 13 and then closing the outer end of such slot by a pin or rivet 16 extending through the two parts of the finger near its free end.

Upon the outer end of the other finger 11 is pivotally and swingingly mounted a locking latch or link 17 so that said link may be extended in line with the finger 11 or may be swung down so as to have the free end 18 of the link slide into the opening 15 on the finger 12. A convenient method of so mounting the link 17 upon finger 11 is to provide the finger 11 with a slot 19 extending longitudinally from the outer end of the finger substantially to the plate 13 and transversely of the finger 11 and in alinement with the finger 12. In this forked outer end of finger 11 is mounted the upper or inner end of link 17 by means of said link having its said inner end provided with an elongated longitudinally extending slot or eye 20 extending from about the middle nearly to the end of said link, as plainly indicated in Fig. 2, and through this elongated eye 20 pin 21 extends, set into and connecting the forked parts of the finger 11.

It will thus be obvious that link 17 is permanently but movably attached to finger 11 and that the link may swing from extended position, as shown in Fig. 1, in alinement with finger 11 to a position at right-angles to said finger, as shown in Fig. 2, and that when in this position at right-angles to finger 11 the link 17 may be made to slide in a line parallel with plate 13 as far as the length of the elongated eye or slot 20 will allow. The parts are so proportioned that when the link 17 is dropped toward the finger 12 the link may be slid upward sufficiently to admit of its lower end 18 being inserted in the opening 15 in finger 12 back of the pin 16, whereupon the link may be further moved downwardly to substantially the position shown in Fig. 2, the extent of such downward movement depending upon the thickness of the second member 5 and its metal rings 10 and the proportion of the parts. It will be understood that the width and thickness of link 17 is less than the diameter of eye 8.

The parts of the fastener are assembled by moving link 17 to extended position, as shown in Fig. 1, moving the two parts of the fastener together or the members 5 and 6 upon which they are mounted so that the free end of link 17 passes through eye 8 and then the fingers 11 and 12 go into and extend through eyes 8 and 9 respectively. Then the locking link 17 is swung downwardly until its then lower end 18 approaches finger 12 whereupon a temporary upward movement of link 17 allows its lower end 18 to be inserted in the opening 15, whereupon the link 17 is pressed downwardly as far as possible.

It will be obvious that these operations will cause the two members to be securely connected to each other through the eyes 8 and 9 of the first member 5 being mounted upon the fingers 11 and 12 and kept from moving therefrom by the locking link 17 which extends from the outer end of one finger to the outer end of the other finger and holds the member 5 for the length of said link between said link and the end of the member 6 or the end plate 13 where such a plate is used.

It will be obvious that when the normal position of the article is such that finger 11 is above finger 12, the weight of link 17 will tend to keep the link in place. Preferably, however, and in order to prevent accidental displacement of the link and to adapt the fastener to be used in any position, link 17 will have a wedging-engagement when in locking position as by means of the outer ends 18 of said link being wedge-shaped or tapered, as plainly shown in the drawings, so that downward movement of the link when in locking position will wedge it tightly into position in an obvious manner between pin 16 and the member 5 or its metal ring 10, if that be thicker than the member 5.

The fastener is detached by moving the link 17 upward until its lower end 18 is withdrawn from opening 15, sliding the link downward and swinging it outward into line with finger 11, when the parts of the fastener and the two members 5 and 6 may be readily withdrawn from each other.

What I claim as new and desire to secure by Letters Patent is:

1. In a fastener for detachably connecting two members, the combination of a first member with two eyes therethrough, a second member, two fingers projecting from the second member and adapted to be inserted in said eyes and to project therethrough and a link permanently but movably connected to the outer end of one of said fingers and adapted to go through one of said eyes and to have its free end swing to and be detachably secured to the outer end of the other finger.

2. In a fastener for detachably connecting two members, the combination of a first member with two eyes therethrough, a second member, two fingers projecting from the second member and adapted to be inserted in said eyes and to project therethrough and a link permanently but slidably and pivotally connected to the outer end of one of said fingers and adapted to go through one of said eyes and to have its free end swing to and slide into an opening provided near the outer end of the other finger.

3. In a fastener for detachably connecting two members, the combination of a first member with two eyes therethrough, a second member, two fingers projecting from the second member and adapted to be inserted in said eyes and to project therethrough, a link adapted to go through one of said eyes and having an elongated slot at one end, and means transversely secured to the outer end of one of said fingers and extending through said link slot whereby the slotted end of said link is slidingly and pivotally connected to the outer end of said finger and the free end of said link is adapted to swing toward and slide into an opening provided near the outer end of the other finger.

4. In a fastener for detachably connecting two members, the combination of a first member with two eyes therethrough, a second member, two fingers projecting from the second member and adapted to be inserted in said eyes and to project therethrough, a link adapted to go through one of said eyes and having an elongated slot at one end and its other end tapered, and means transversely secured to the outer end of one of said fingers and extending through said link slot whereby the slotted end of said link is slidingly and pivotally connected to the outer end of said finger and the free end of said link is adapted to swing toward and wedgingly slide into an opening provided near the outer end of the other finger.

In witness whereof I have affixed my signature, in the presence of two witnesses, this 30th day of July 1915.

WILLIAM B. FOSTER.

Witnesses:
C. D. PHILLIPS,
S. E. HOOKS.